Aug. 23, 1938.   B. MARTINS   2,127,609
WHEEL SUSPENSION
Filed April 12, 1937   4 Sheets-Sheet 1
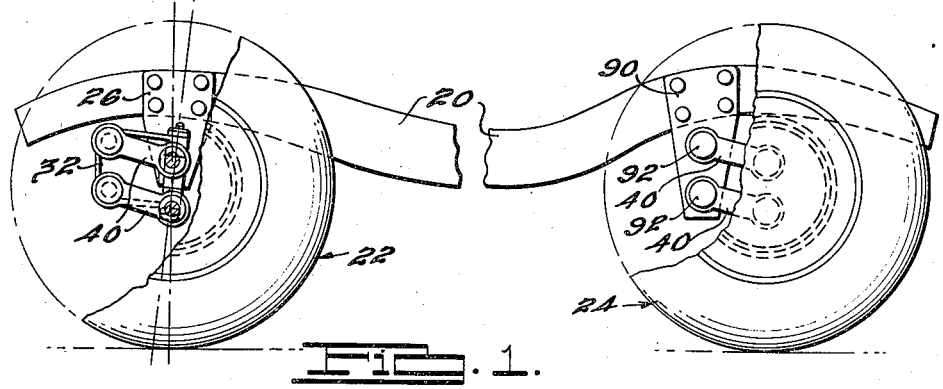
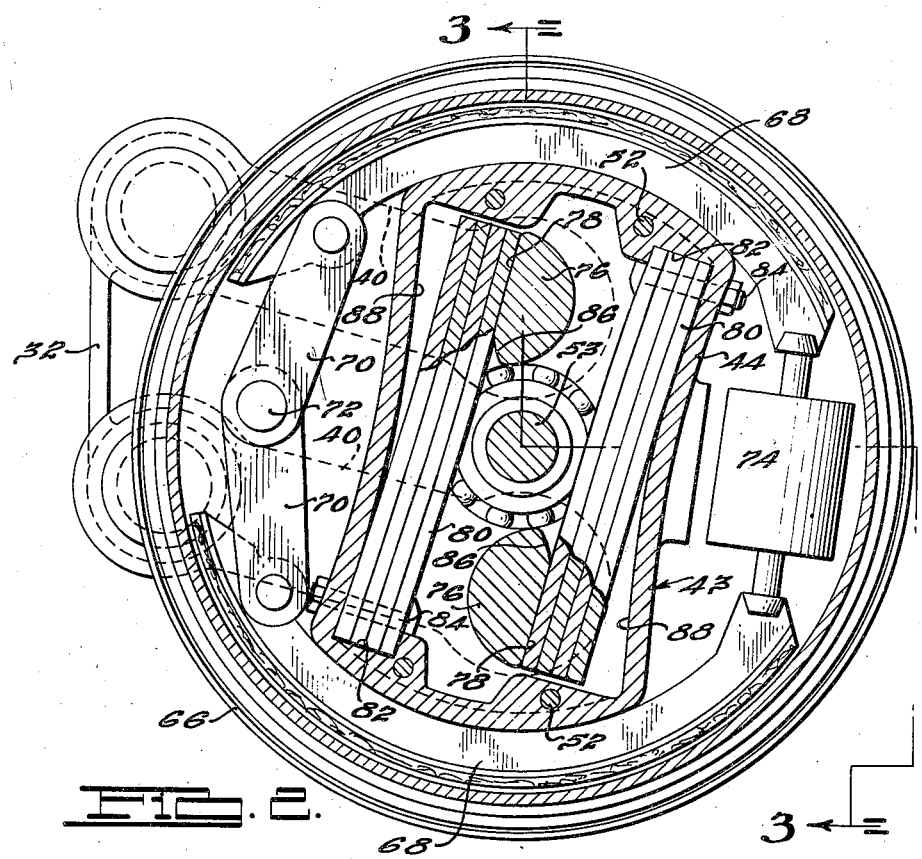
INVENTOR
Borge Martins.
BY
Harness, Dickey & Pierce
ATTORNEYS

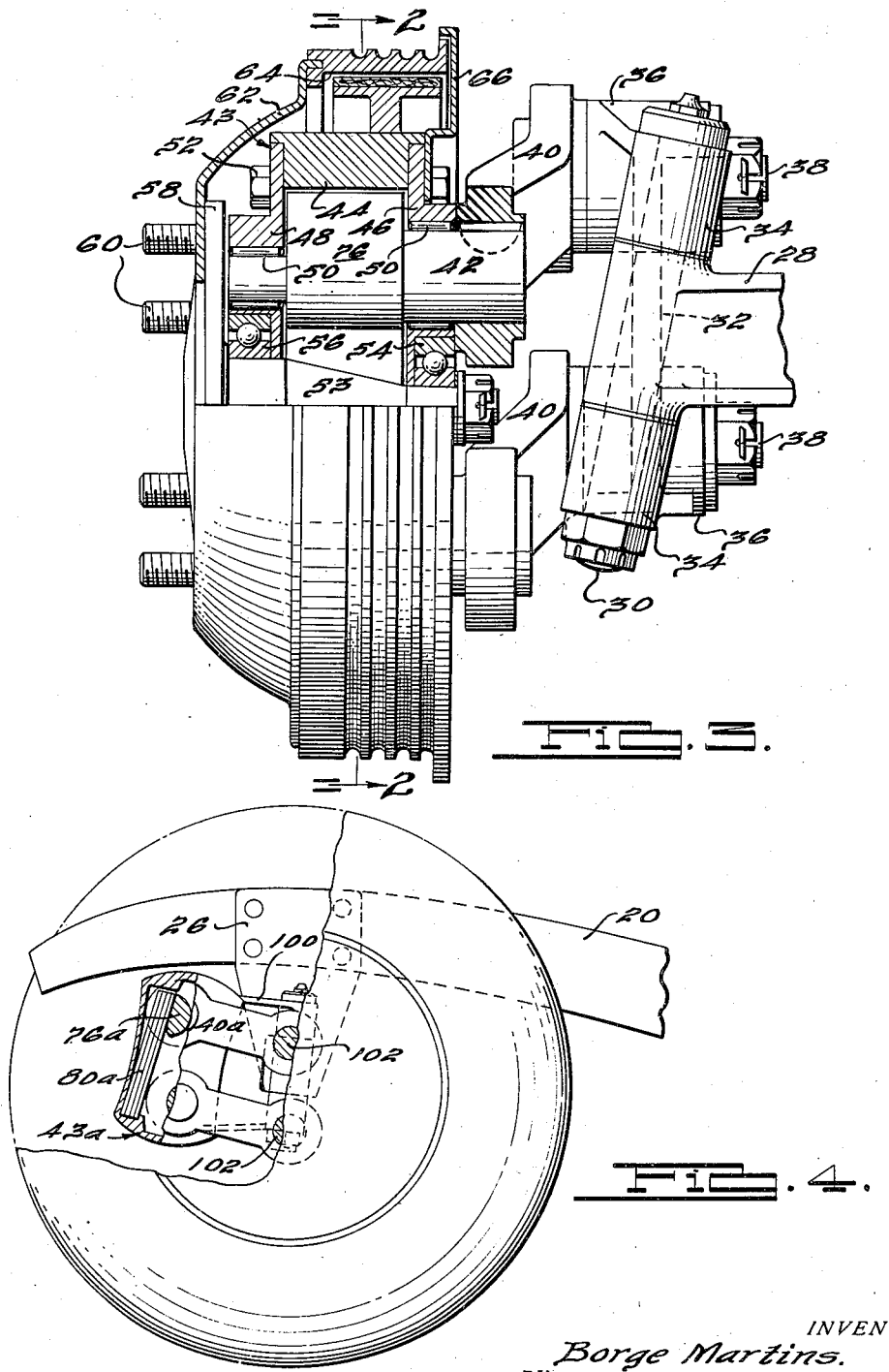

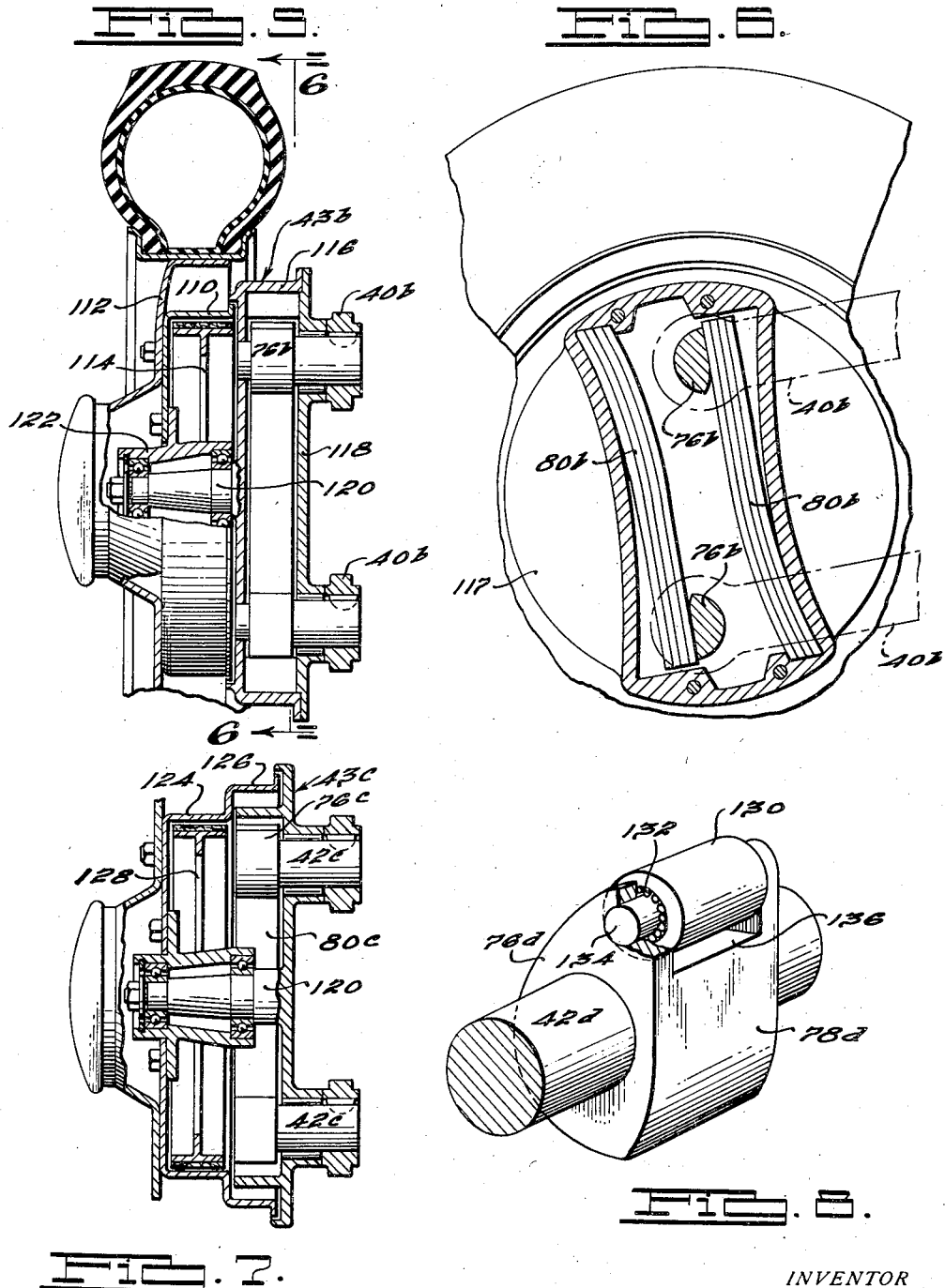

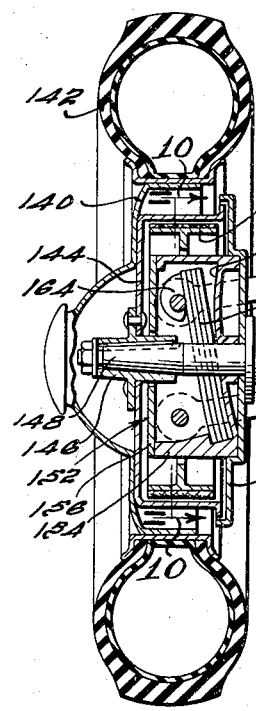

Patented Aug. 23, 1938

2,127,609

UNITED STATES PATENT OFFICE 2,127,609

WHEEL SUSPENSION

Borge Martins, Copenhagen, Denmark

Application April 12, 1937, Serial No. 136,239
In Denmark November 13, 1936

19 Claims. (Cl. 267—19)

This invention relates to spring suspensions and while its principles are capable of a relatively wide application it is particularly adaptable as a spring suspension for motor vehicles.

Objects of the invention include the provision of a new and novel resilient connection between a pair of relatively movable parts; the provision of a resilient connection between a pair of relatively movable parts that is simple in construction, efficient in operation, economical to manufacture and which will occupy a minimum of space; the provision of a resilient connection between a pair of relatively movable parts in which spring means are provided which are constantly maintained under stress tending to maintain one of the relatively movable parts in predetermined position with respect to the other thereof and intermediate the limit of movement between said parts in opposite directions; and the provision of a resilient connection between a pair of relatively movable parts in which these spring means are carried by one of the parts, a rotatable cam member is carried by said one of said parts in a position to stress the leaf spring means and to vary the stress therein, and link means connect said one of said parts to the other of said parts and effect rotational movement of the cam upon relative movement between said parts.

Other objects of the invention include the provision of a spring suspension for motor vehicles having a wheel part and a chassis part, one of the parts being provided with leaf spring means and rotatable cam means associated with the leaf spring means to vary the stress in the leaf spring means upon rotation of the cam means, the cam means being connected to the other of the parts by linkage means fixed to the cam means to control the relative rotational position thereof and pivotally connected to said other of said parts; the provision of a construction as above described in which leaf spring means is installed under an initial tension tending to maintain the cam means in a predetermined position of rotation with respect to the leaf spring means and which position is intermediate the limit of the rotational movement of the cam means in opposite directions; the provision of a construction as above described in which variation of the rotatable position of the cam means from that predetermined position will increase the stress of said spring means regardless of the direction of rotation of the cam means; the provision of a construction as above described in which spring means and cam means may be carried either by the chassis part or by the wheel part; the provision of a construction as above described in which the spring means and cam means may be positioned approximately entirely within the lateral confine of the wheel part; the provision of a construction as above described in which the spring means and cam means may be located within the usual brake drum carried by the wheel of a motor vehicle; the provision of a construction as above described so constructed and arranged as to permit steering movement of the wheel part; and the provision of a construction as above described in which the axis of rotation of the cam means and of the link means may be arranged parallel to the axis of the wheel part, or in a direction transverse to the axis of the wheel part.

Further objects of the invention include the provision of a spring suspension for motor vehicles in which the arrangement of the spring element is such as to reduce the effect of the unsprung weight of the vehicle; the provision of a spring suspension for motor vehicles in which the necessity of employing independent shock absorbers is reduced; the provision of a spring suspension for motor vehicles so constructed and arranged as to normally maintain the position of the wheels with respect to the chassis when subjected to any load up to the normal load on the wheel; the provision of a spring suspension for motor vehicles in which the rate of deflection of the spring means is increased during the addition of equal increments of load upon the vehicle in excess of the normal load thereon; and the provision of a spring suspension for motor vehicles in which the wheels will maintain approximately their normal position with respect to the vehicle chassis when the vehicle is raised by direct application of power to the chassis per se independently of the wheels.

The above being among the objects of the present invention the same consists in certain novel features of construction and combinations of parts to be hereinafter described with reference to the accompanying drawings, and then claimed, having the above and other objects in view. In the accompanying drawings which illustrate suitable embodiments of the present invention and in which like numerals refer to like parts throughout the several different views, Figure 1 is a more or less diagrammatic, partially broken side elevational view of an automobile chassis and connected wheels provided with a spring suspension constructed in accordance with the teachings of the present invention;

Fig. 2 is an enlarged partially broken sectional view taken centrally through one of the wheel suspension means shown in Fig. 1 in the direction of the plane of the wheel, and as on the line 2—2 of Fig. 3;

Fig. 3 is a partially broken, partially sectioned edge view of the construction shown in Fig. 2, the section being taken axially through a portion of the mechanism as on the line 3—3 of Fig. 2;

Fig. 4 is a more or less diagrammatic side elevational view showing a fragment of a motor vehicle equipped with a spring suspension in accordance with the principles of the present invention but in which the spring unit is carried by the chassis frame instead of by the wheel as in the preceding views;

Fig. 5 is a fragmentary, partially broken, partially sectioned view taken axially through a wheel equipped with a modified form of the present invention and in which the spring means are carried by the wheel but outside of the usual brake drum thereon;

Fig. 6 is a fragmentary, sectional view of a structure shown in Fig. 5 and taken as on the line 6—6 thereof;

Fig. 7 is a fragmentary view similar to the view shown in Fig. 5 but illustrating the still further modification of the present invention;

Fig. 8 is a fragmentary perspective view of a modified form of cam means applicable for use in any of the foregoing or following forms of construction;

Fig. 9 is a view similar to Fig. 5 but showing a still further modified form of construction;

Fig. 10 is a fragmentary, sectional view of the construction shown in Fig. 9, taken as on the line 10—10 thereof;

Fig. 11 is a view similar to Fig. 10 but illustrating a modified form of construction; and Fig. 12 is a partially broken, partially sectioned view taken edgewise of the wheel illustrating a modified form of the construction shown in Figs. 9, 10 and 11.

As previously mentioned the present invention is applicable for use in a variety of different installations where it is desired to resiliently connect a pair of relatively movable parts but its advantages are such as to make it particularly adaptable for use as a spring suspension for motor vehicles and, accordingly, such use only will be described in the following specification and shown in the accompanying drawings, and its applicability to other uses will be apparent to those skilled in the art once the teachings herein are made known to them. In some respects the present invention is an improvement on the construction shown and claimed in my co-pending application for Letters Patent of the United States for improvements in spring suspension, filed August 28, 1936, and serially numbered 98,272, but the construction herein provided is simpler, more economical to build, and includes certain inherent advantages not found in my previously described construction.

Briefly stated, in accordance with the present invention a spring unit is mounted either in or on a vehicle wheel or upon the vehicle chassis and includes one or more leaf spring units and a cooperating cam adapted to vary the stress in the spring unit, the position of the cam being controlled by means of linkages connecting the wheels to the chassis frame. The construction is capable of being and is preferably so constructed and arranged that the leaf spring unit is placed under an initial tension which cooperates with the cam means to normally maintain the wheels in a predetermined position of elevation with respect to the chassis frame regardless of the load on the vehicle, and preferably such as to maintain the wheels in such position with a normal load upon the vehicle, this being in contrast to conventional constructions in which the free position of the spring locates the wheel in a much different relation with respect to the chassis frame than when the spring is under normal load. The inherent advantage of this phase of the present invention is that the stress on the spring unit is increased regardless of whether the wheel moves upwardly or downwardly with respect to the chassis frame from its normal position with respect thereto, thus providing the same effect on the movement of the wheels as is obtained by the use of the usual type of shock absorbers but without the necessity and expense of providing such shock absorbers independently of the spring suspension. Preferably the construction is further so constructed and arranged that the effective length of the spring unit is decreased as the wheel moves either above or below its normal position with respect to the chassis frame, thus as in my above identified patent application and others filed previously thereto the spring suspension is enabled to function properly over a much greater range of vehicle load than is possible in connection with spring suspensions of conventional construction.

Referring now to the accompanying drawings in Fig. 1 is illustrated a vehicle chassis including frame side members 20, the front end of the vehicle being assumed to be at the lefthand side of the figure and the rear end at the righthand side of the figure. Accordingly, the vehicle is equipped with front wheels indicated generally at 22 and rear wheels indicated generally at 24. In the present case the spring suspension for both sets of wheels 22 and 24 is deemed to be substantially identical except that in connection with the front wheels 22 means are provided to permit steering movement of such wheels in order to guide the path of travel of the vehicle.

Referring to Figs. 2 and 3 which show the application of the invention to the front or steering wheels, as well as to Fig. 1, the chassis frame side rail 20 is shown as being provided adjacent the center of the front wheel with a downwardly projecting bracket 26 rigidly secured thereto. As illustrated in Fig. 3 this bracket is provided with an outwardly projecting arm portion 28 formed in accordance with the outer end portion of a conventional front axle for reception of a king-pin 30 therein. A plate-like bracket member 32 is formed to provide a pair of spaced bearings 34 at one end thereof which are rotatably mounted on opposite ends of the king-pin 30 at opposite faces of the outer end of the arm 28. The bracket member 32 projects forwardly from the bracket member 26 and at its forward edge is provided with a pair of vertically spaced horizontally arranged bearings 36 in which horizontally extending bolts 38 are rotatably received. The bolts 38 serve to pivotally connect the forward ends of a pair of parallel links or arm members 40 to the bracket 32.

The rear end of each of the arms 40 is rigidly fixed to the inner end of a cam shaft 42. The cam shafts 42 are arranged in vertically spaced relationship corresponding to the vertical spacing of the bolts 38 and each is rotatably mounted in the opposite end plates of a housing indicated generally at 43 and comprising a central or main body portion 44, an inner end plate 46 and an outer end plate 48, by means of suitable antifriction means such as the roller bearings 50. The end plates 46 and 48 are secured to each other and to the body member 44 by means of bolts 52 which extend through all three of these parts.

The spindle 52 for the wheel 22 is also rotatably supported in the end plates 46 and 48 by means of suitable anti-friction means 54 and 56, the spindle 52 being located centrally of the housing midway between the cam shafts 42. In accordance with some forms of conventional constructions the outer end of the spindle 52 is provided with a flange 58 preferably formed integrally therewith and which is provided with a plurality of outwardly extending studs 60 which serve to secure the wheel 22 with respect to the spindle 52 and also the brake drum 62. It will be noted that in the particular embodiment of the invention shown in Figs. 2 and 3 the brake drum 62 extends into outwardly surrounding relationship with respect to the housing 43 and that its braking surface 64 lies in radially outwardly spaced relation with respect to the housing. A backing plate 66 which is secured to the end plate 46 by means of the bolts 52 extends into protecting relation with respect to the open edge of the brake drum 62 in accordance with conventional practice.

Positioned between the radially outer edge faces of the housing 43 and the braking surface 64 of the brake drum 62 is a pair of friction elements shown in the form of brake shoes 68, and while in accordance with the present invention these friction elements may be of any suitable or conventional construction in the particular instance shown one end of each of them is pivotally connected by a link 70 to an anchor pin 72 carried by the backing plate 66, and an hydraulic cylinder 74 which may be of any suitable or conventional construction is interposed between the free ends of the shoes 68 for the purpose of spreading the shoes and is adapted to be connected to the usual master cylinder (not shown) of a conventional or suitable hydraulic braking system.

Each cam shaft 42 has formed thereon within the housing 43 a cam 76, each cam being provided with a flat face 78, the face 78 of one cam facing in the opposite direction from the face 78 of the other cam.

Also positioned within the housing 43 are two leaf spring assemblies 80 each assembly shown by way of illustration as comprising four leaves. One end of each leaf spring assembly 80 is anchored in the housing 43 by reception of such end in a pocket 82 formed in the main body portion 44 thereof for that purpose, the pockets 82 being formed at diametrically opposite points in the housing 43 in relation to the axis of the wheel spindle 53 and so that the spring assemblies 80 are positioned with the approximate plane of their leaves in parallel relation to the axis of the wheel spindle 53 and with the assemblies on opposite sides of the spindle 53. Each spring assembly may be anchored against longitudinal movement in its corresponding pocket by means of a bolt 84 passing through the leaves of the assembly and the wall of the housing portion 44. The relation of the parts is further preferably such that when the wheel 22 is in its normal position with respect to the chassis frame of the vehicle, that is when the vehicle is under a normal load, such free end of each leaf assembly lies in approximately flat contacting relationship with respect to the corresponding flat face 78 of the corresponding cam 76. It will be observed that to effect this result it is necessary that the spring assemblies 80 must be inserted in place within the housing 43 in a stressed position because the proportionate weight of the vehicle acting through any one wheel will tend to swing the arm 40 as viewed in Fig. 2 in a counter-clockwise direction of rotation and the spring assemblies 80 must exert a sufficient force to hold their free ends in approximately flat contacting relationship with respect to the faces 78 of the corresponding cam 76 in order to resist this tendency.

It will be apparent from the construction thus far described that any increase in load upon the front end of the vehicle chassis in excess of the normal load thereof, regardless of the cause of such load, will tend to move the forward ends of the links 40 downwardly and to rotate the cams 76 in a counterclockwise direction of rotation, as viewed in Fig. 2, so that the radial outer edges thereof, as compared to the center of the wheel, will be caused to rotate in a direction which will cause such outer edges of the cam to bear against the free end portions of the leaf spring assemblies 80 and cause the leaf spring assemblies to bend an amount depending upon the increased load and thereby set up an additional stress in them which will resist further rotational movement of the cams 76 under the added load. The cams 76 thus acting under an added load imposed on the vehicle over the normal load thereon will so cooperate with the leaf spring assemblies 80 as to resiliently accommodate such variation in load, the stress in the spring assembly constantly urging the various parts back to their preferred normal position best illustrated in Fig. 2. This same effect will, of course, persist even though the initial tension of the spring assemblies 80 is not sufficient to hold the end portions of the spring assemblies in approximately flat relation with respect to the flat faces 78 of the corresponding cam 76 which is described as the preferred condition. Where the preferred condition exists and the ends of the leaf spring assemblies lie approximately in flat relation with respect to the flat faces 78 of the cam 76 under normal load, where the car rebounds from a condition of greater than normal load the links 40 will, of course, be moving in a clockwise direction of rotation about the axis of the cam 76 as viewed in Fig. 2, the stress of the springs 80 tending to return the cam 76 to the normal position indicated in Fig. 2, and as soon as such normal position is reached and the frame tends to raise above its normal position above the center of the wheels the radially inner edges of the cams 76 will thereupon bear against the corresponding spring assemblies 80 and tend to again increase the stress therein which added stress will resist such relative movement between the wheel and frame.

It will be recognized that this last described feature of the present invention in its preferred form is substantially contrary to the action which occurs in conventional spring suspension structures for motor vehicles. For instance in a motor vehicle equipped with conventional semi-elliptic springs, any increase in load on the vehicle in excess of the normal load increases the stress in the springs in the same general manner as occurs in connection with the present invention, but where the load on the vehicle is decreased under the normal load normally imposed thereon, the stress in the springs continues to decrease until the free position of the spring is reached and any further movement in this direction will then begin to set up a stress in the spring in the opposite direction to that acting when the spring is under normal load. In view of the fact that it is very seldom under almost any conditions of driving that the upward movement of a car is ever sufficiently great to permit a conventional semi-elliptic spring to reach its naturally free state, it will be apparent that the stresses set up in the spring will serve to increase instead of dampen out the relative rebound movement between the wheels and the chassis frame upon decrease of the load on the chassis frame below the normal load thereon. This is one of the primary reasons why it is necessary to employ independent shock absorbing means in connection with motor vehicles employing a conventional type of spring suspension. On the other hand where the preferred form of the present invention is employed and where the relation of the parts are as illustrated in Fig. 2 when the vehicle is under normal load, relative movement between the wheels and frame of the vehicle in either direction from the position of normal load on the vehicle is resisted by increasing the stress in the springs 80 acting in the same direction and, therefore, equally effective to resiliently resist such relative movement between the wheels and frame regardless of whether the load on the vehicle is either increased beyond or decreased below the normal load thereon. For this reason it is possible to eliminate the added expense of conventional shock absorbers when employing the present invention.

Because of the fact that the radially inner edge portion of each of the cams 76, in relation to the center of the wheel, is materially closer to the anchored end of the corresponding leaf spring assembly 80, unless modified equal increments of angular movement of each cam 76 in opposite directions from its normal position illustrated in Fig. 2 would stress the corresponding spring assembly 80 different amounts due to the difference in leverage arm through which it acts upon the spring assembly. Unless otherwise modified this might provide an unnecessarily stiff spring action during rebound conditions and to obviate any possibility of the same the radially inner edge portions of the flat face 78 of each cam 76 is preferably curved inwardly as illustrated at 86 in Fig. 2 so as to reduce the effectiveness of this portion of each cam on the corresponding leaf spring assembly 80 under rebound conditions. While the curvature of the portions 86 may be varied to obtain any desired degree of modification of the action of each cam upon its corresponding spring during rebound conditions it will usually be found desirable to so shape such edges of the cam as to render them substantially equally effective in stressing the corresponding spring assembly 80 as the radially outer edges of the cams for equal increments of angular movement in opposite directions from the normal load position of such cams.

Attention is also directed to the fact that with the construction thus far described as an increase in load is imposed upon the vehicle over the normal load thereof, movement of each cam 76 to resist such added load will cause the line of contact between the cam and its corresponding leaf spring assembly 80, and which line contact occurs at all times except when the leaf spring assembly lies flat against the flat face 78 of the cooperating cam 76, to shift toward the anchored end of the leaf spring, thereby tending to reduce the effective lengths of the spring and having the effect of reducing the rate of deflection of the springs during added equal increments of load imposed upon the vehicle. On the other hand, at the same time the line of contact of each cam with its corresponding spring assembly in moving about the center of each cam is moving in the path of a circle and the movement of such line of contact away from a vertical plane passing through the axis of the cam, becomes less during equal increments of angular movement of the cam about its center as the load increases but due to said angular motion of the cam the moment arm of the resulting force acting on the spring decreases and consequently the effective leverage of the cam on the spring is increased as the load increases over normal. The above mentioned reduction of the rate of deflection of the springs and the increase in effective leverage of the cams are found to substantially counteract each other so that from a practical standpoint with the construction as thus far described equal increments of load added on the vehicle beyond its normal load will cause equal increments of angular movement of the cam 76 during a normal range of load conditions on the vehicle. This effect, however, is not always desired for the reason that when this effect exists if the vehicle is to have the desired soft riding qualities under normal load conditions then it will either be limited in its range of satisfactory load variation or else the possible degree of movement between the wheels and the frame will have to be in excess of that generally accepted as commercially practicable. On the other hand under such conditions if the springs are to be designed to enable them to satisfactorily accommodate the desired wide range of load variations on the vehicle the springs will have to be of such stiffness that the vehicle will ride "hard" under normal load conditions. These disadvantages are obviated in accordance with a further phase of the present invention by so constructing and arranging the housing 43 with respect to the leaf spring assemblies as to cooperate therewith to modify the action of the springs under various degrees of bending. This action is obtained in a manner similar to that disclosed in my co-pending application for Letters Patent of the United States heretofore identified herein. Specifically this is accomplished by extending the wall of each pocket 82 on the outer face of each spring assembly 80 so as to form a curved track 88 with which the spring may progressively contact from its anchored end towards its free end as its degree of bending is increased beyond that of its normal load position. In other words each track 88 which is formed upon the inner face of the central body member of the housing 44 is so curved and located with respect to the corresponding outer face of the corresponding leaf spring assembly 80 that as the leaf spring assembly 80 is bent in excess of the bent condition it assumes under normal load conditions the length of contact of the leaf spring with the track will be increased from its anchored end towards its free end and will thus reduce the effective length of the spring and thereby decrease its rate of deflection under equal increasing increments of load. Obviously the relative decrease in rate of deflection may be varied to suit any desired condition of spring reaction by varying the curvature of the tracks 88, and by this means a construction may be provided which will provide a desired soft ride under normal load conditions and yet one which will accommodate a much greater range of effective loads on the vehicle without entirely losing the desired springing action considerably beyond that possible in accordance with conventional spring suspension practice.

Attention is directed to the fact that in the construction above described there will be no phase in the entire springing action between the wheel and the vehicle chassis frame at which the springs will not be under stress and the least stress to which it can be subjected is that under which it is subjected at normal load when the preferred arrangement is employed as above described. Under no conditions, however, will it be desired to so arrange the construction that it will not be necessary to insert the spring assemblies 80 under stress and, accordingly, whatever condition of spring relation between the vehicle wheels and chassis frame exists the springs will always be under stress and the stress acting in the same direction.

Preferably the assembled stressed condition of the spring assemblies 80 will be such that should a jack be placed under the frame of the vehicle and the frame of the vehicle lifted, as differentiated from lifting the vehicle through the wheels, as the frame of the vehicle is lifted the wheels will be lifted equally with the frame and obviously this will be a great advantage in the changing of tires and the like. Even though this condition exists when the vehicle is lifted by a jack or slowly by other means, during actual running conditions on a road rebounding action of the vehicle with respect to the wheels above the normal position of the frame with respect to the wheels will not lift the wheels from the road surface under ordinary conditions but the inertia of the wheels in their movement with respect to the frame will constrain them to maintain their contact with the ground. It may be said of this construction that the springs carry the wheels, whereas in conventional constructions the wheels obviously carry the springs. Furthermore, it will be noted that in the construction described the springs themselves have no fixed relation with respect to the vehicle frame as occurs in all conventional constructions and the reduction in the effect of shocks on the wheels transmitted to the vehicle frame by the use of the present invention is at least partially attributable to this fact.

An impression may be gathered at first glance from an inspection of the present invention that it may add a considerable amount of unsprung weight to a vehicle but such effect is not observed in practice. The added weight of the present invention to a wheel assembly is as a matter of fact relatively small but any such added weight is more than offset from the standpoint of added unsprung weight on a vehicle by reason of the fact as previously explained in the present invention that the springs serve to carry the wheels rather than the wheels serve to carry the spring as in conventional constructions.

It may also be observed that the present invention is relatively simple in construction and involves a relatively small number of parts that may be ruggedly constructed. Furthermore, the parts are so constructed and arranged as to require a minimum amount of machining all of which tends to economy in production and to long life of the parts. It may also be observed that with the construction described the plane of the wheels remains constant during springing action thereof.

Where the above described construction is applied to the rear wheels of a vehicle such as illustrated in Fig. 1 it will be apparent that the elimination of the necessity of swinging the wheels for steering movement enables a simplification of the mounting of the parallel links, the links 40 themselves and all parts of the mechanism contained within the brake drum being identical to the construction thus far described. Thus where the previously described construction is adapted to the rear wheels of a vehicle as illustrated in Fig. 1 all that is necessary is to provide a bracket such as 90 rigidly fixed to the corresponding frame side member 20 of the vehicle chassis slightly in advance of the corresponding rear wheel 24. The forward ends of the links 40 in such case are pivoted by means of suitable bolts or pins 92 to the corresponding bracket 90 as illustrated, all the advantages of the construction previously described being, of course, realized.

In the broader aspects of the present invention it is not essential that the leaf spring assemblies corresponding to the assemblies 80 previously described be located within or adjacent the hub of the wheel, but these may be carried directly by the frame if desired. Such construction is illustrated in Fig. 4 which illustrates a modification of the construction previously described. In this case the same bracket 26 as previously described is secured to the frame side member 20 in identically the same manner and is provided with a projecting portion 28 in identically the same manner as previously described. Instead of employing the identically same plate member 32 as in the construction previously described in this case a plate member 100 is employed, mounted upon the projecting ends 28 by a king-pin 30 in the same manner as previously described, but on its forward end is rigidly secured a housing 43a corresponding in all respects to the housing 43 previously described except that in this instance no provision is made for the reception of the wheel spindle. The housing 43a includes the same leaf spring assemblies 80a and cams 76a as in the previously described construction, the links 40a corresponding to the links 40 previously described being similarly connected to the cams 76a at their forward ends in this case. The rear ends of the links 40a are pivotally mounted on pins 102 in this case carried by the wheel. As will be observed in this modified construction variations in load upon the vehicle varying the effective distance between the wheel center and the chassis frame will effect swinging movement of the links 40a and oscillation of the cams 76a to vary the stress of the springs 80a and thus effect the same general result as described in connection with the previously described construction. The construction shown in Fig. 4 is, of course, that for the front or steering wheels of a vehicle and it will be apparent that where the construction shown in Fig. 4 is applied to the rear wheels of the vehicle the housing 43a will be rigidly attached preferably directly to the corresponding frame side member 20.

There may be certain instances in which it may not be practical to position the leaf spring assemblies within the confining area of the brake drum as illustrated in Figs. 1, 2 and 3 but where it is still desired to associate them with a wheel as in Figs. 1 to 3, inclusive. Such an occasion may arise because of the use of an excessively small diameter brake drum and in which the spring assembly if positioned therein would necessarily be stressed over the full range of movement beyond a value considered desirable without the employment of special types of steels or steel alloys for the springs. In such event, however, the same general effect may be obtained by modifying the construction shown in Figs. 1, 2 and 3 as illustrated in Figs. 5, 6 and 7. Referring to Figs. 5 and 6, for instance, instead of providing a housing such as the housing 43 previously described positioned within the confines of the brake drum, a housing indicated generally at 43b is provided immediately inwardly of the brake drum 110 for the wheel 112. In this particular case the housing 43b is so constructed and arranged as to further perform the function of the usual backing plate provided in conjunction with a brake drum and may serve to operatively support the friction elements 114 provided within the brake drum 110 for cooperation therewith. It may also be noted that in this particular instance the housing 43b is formed in two parts only, namely a main portion 116 of pan-like formation having laterally projecting marginal flange portions 117 completing the backing plate effect thereof and a single end plate portion 118. As will be observed from an inspection of Figs. 5 and 6 the housing 43b projects radially outwardly beyond the periphery of the brake drum 110 which, accordingly, enables the spring assemblies 80b, corresponding to the spring assemblies 80 previously described, to be of a length equal to or greater than the diameter of the brake drum. Cams 76b, cooperating links 40b, and other parts of the construction may be of the same general character as those previously described. The functioning of the construction shown in Figs. 5 and 6, will, of course, be identical to that described in connection with Figs. 2 and 3. It might be observed that the wheel mounting shown in Fig. 5 varies somewhat from that shown in Fig. 3 but is still of a more or less conventional construction except that in this case the wheel spindle 120 is carried directly by the housing 43b and is provided with a hub structure 122 rotatable thereon to which the brake drum 110 and wheel disc 112 is connected in a conventional manner.

The same effect as obtained in Figs. 5 and 6 may also be obtained by means of the modification illustrated in Fig. 7. In this case the brake drum 124 is provided with a marginal enlargement 126 extending outwardly beyond the friction elements 128 and such extension serves as partial enclosure of a spring suspension structure of approximately the same construction as previously described. In this case the housing 43c consists of a single member providing a single bearing for each cam shaft 42c, as an anchorage for the spring assemblies 80c, as a support for the wheel spindle 120c and as a dust cover and backing plate for the brake drum. The spring assemblies 80c being placed in the enlarged marginal extension portion 126 of the brake drum 124 enables them to be of a length in excess of that which could be received directly within the main portion of the brake drum 124. The functioning of this construction will obviously be identical to that previously described.

In the constructions thus far described, as well as the modifications to be later described criticism may arise in some instances on the assumption that an excessive amount of friction will occur between the cam 76 and the corresponding spring assembly 80 by reason of the fact that line contact will exist therebetween and a rubbing action will occur between the cam and the spring assembly during relative movement between the two. While this is not believed to be of great consequence in any case it may, of course, be eliminated by the provision of anti-friction means between the cam and the spring assembly. While any suitable means may be provided for this purpose one suitable construction is suggested in Fig. 8.

Referring to Fig. 8 a cam shaft 42d is illustrated as being provided with a cam 76d, both of which are constructed in substantial accordance with the similarly numbered parts heretofore described. Although anti-friction means may be provided at both edges of the operative flat face 78d of the cam, as a matter of illustration such means is shown only at the radially outer edge thereof in Fig. 8. This comprises a roller 130 suitably mounted by means of needle or other suitable roller bearings 132 upon a pin 134 which bridges a centrally cut out portion 136 in the radially outer edge portion of the cam 76d. The periphery of the roller 130 is preferably in substantially flush relationship with the flat face portions 78d of the cam 76d although if desired it may project slightly outwardly therebeyond. In any event it preferably projects radially outwardly beyond the outer edge of the face 78d so that it serves as a sole medium of contact between the cam and the spring assembly during rotation of the cam in one direction from the normal position thereof. The provision of such anti-friction means will effectively eliminate any possible ill effect of any rubbing action between the cam and the spring assembly that might occur in the previously described constructions.

In the broader aspects of the present invention it is not necessary that the links such as the links 40 previously described, and the cams such as the cams 76 previously described, rotate about axes extending transversely to the length of the automobile as it will be apparent to those skilled in the art that these axes may be disposed at an angle to the length of the automobile and even be disposed in parallel relation thereto. This last type of construction is illustrated in Figs. 9 to 12, inclusive. Referring to Figs. 9 and 10, which show the application of such modification to the rear or driving wheels of an automobile, a wheel is shown at 140 as being provided with a tire 142. The wheel 140 is fixed relative to a brake drum 144 positioned centrally thereof and which in turn is mounted upon a hub 146 secured to the end of an axle shaft 148, it being understood that the axle shaft 148 is preferably of the articulated type permitting suitable drive to the wheels without limiting its springing movement with respect to the frame as is conventional in automobiles having independently sprung rear wheels.

Within the brake drum 144 suitable brake friction elements 150 are positioned in much the same manner as illustrated in Figs. 2 and 3 and also positioned within the brake drum and inwardly of the friction elements 150 is a spring and cam housing assembly indicated generally at 152. The housing 152 includes a main body portion 154, an outer end plate 156 and an inner cover 158 which also serves as a backing plate for the brake drum 144 and as a support for the friction elements 150.

Within the housing 152 and positioned in perpendicular relationship with respect to the axis of the shaft 148 are a pair of vertically spaced, horizontally extending shafts 160 and 162, these shafts being positioned on opposite sides of the axle shaft 148 and being rotatably supported at opposite ends in the housing and projecting beyond the opposite side faces thereof. The upper shaft 160 has a pair of cams 164 formed thereon within the housing 152, one at each side of the housing, and the bottom wall of the housing is formed to provide a pair of pockets in vertical alignment with the cams 164, as viewed in Fig. 10, for reception of the lower ends of a pair of leaf spring assemblies 166. The upper ends of each of the leaf spring assemblies 166 bear against the flat face of the corresponding cams 164 in much the same manner as in the constructions previously described. Preferably the housing 152 is formed to provide a curved track 168, similar in purpose and contour to the tracks 88 previously described, for cooperation with the leaf spring assemblies 166.

The chassis frame side member 20e at a point in substantial lateral alignment with the wheel 140 is provided with an outwardly and downwardly projecting bracket member 170 having portions spaced longitudinally of the vehicle through which pins 172 having their axes horizontally arranged and in substantial alignment with the length of the vehicle are provided for pivotally connecting the end portions 174 of links 176 and 177 thereto. There are four such pins 172 forming two pair of axially aligned but axially spaced pivotal connections for one pair of links 176 and one pair of links 177, the links 176 being arranged in vertically spaced relation to the links 177. The opposite ends of the links 176 extend to and are fixed to the opposite projecting ends of the shaft 160, and the opposite ends of the links 177 extend to and are fixed to the opposite projecting ends of the shaft 162. Preferably the ends 174 of the links 176 and 177 are spaced longitudinally of the motor vehicle a greater distance at their point of connection therewith than at their point of connection to the corresponding shafts 160 and 162 so as to impart greater longitudinal stability to the wheel 140 with respect to the frame 20e. It will be understood that the links 176 and 177 form a connection between the frame 20e and the wheel 140 which will permit vertical movement of the wheel with respect to the frame but without causing any rocking movement of the wheel about its point of contact with the ground where the links 176 and 177 are all of the same length and the links 176 are equally vertically spaced at opposite ends from the links 177.

With the construction shown in Figs. 9 and 10 it will be understood that the lower pair of links 176 simply cooperate with the upper pair of links 176 to form a more or less parallel link motion whereby relative vertical movement between the wheel and frame is permitted while maintaining the wheel in its desired vertical position. Both cams 164 are formed on the upper shaft 160 and consequently during any relative vertical movement between the wheel and frame these are caused to rotate and vary the stress of the springs 166 in the same general manner and with the same general results as in the construction heretofore described and explained. The spring assemblies 166 are preferably inserted in place so that they will be maintained under a positive stress upon assembly to obtain substantially the same beneficial results as is obtained for the same reason in the previously described structures. The main difference is that in this construction the leaf springs are anchored at corresponding ends instead of at opposite ends as in the previously described construction, the cams which vary the stress of the springs are both carried by the same shaft, and the axis of rotation of the cams and the pivotal axes of the links are in approximate parallelism with the length of the automobile instead of transverse thereto as in the previously described construction. The modification of the invention disclosed in Figs. 9 and 10 is not believed to be as desirable as the preferred construction previously described for the reason that additional links connecting the wheel to the frame are required to enable the wheel to stand the road shocks met with in usual travel and additionally scuffing of the tires on the wheel may occur during relative movement between the tire and frame unless the geometry of the links 176 is proportioned to prevent it but in which event a slight rocking of the wheels may occur during such relative movement. These disadvantages, if they may be called such, are slight however and may be found to be of no practical importance.

Where a construction of the type shown in Figs. 9 and 10 is employed it is not necessary that both of the cams be secured to the same shaft as illustrated in those figures, but if desired one cam may be applied to each of the shafts 160 and 162 in which case it will be necessary to anchor the spring assemblies at their opposite ends instead of at the corresponding end as shown in Figs. 9 and 10. Such a modification is illustrated in Fig. 11 in which parts corresponding to the parts shown in Fig. 10 are indicated by the same numerals except that such numerals bear a prime mark. As illustrated in Fig. 11 the shaft 160' is provided with one cam 164', corresponding to the cams 76 previously described, at one end thereof within the housing 162' and the shaft 162' is provided with a cam 164' at that end thereof at the opposite side of the housing from the first mentioned cam 164'. In this case the leaf spring assemblies 166' are each anchored at that end of the housing opposite the cooperating cam 164', thus effecting a construction more similar to the constructions first described. The net effect of this construction is, of course, substantially the same as that obtained in the construction shown in Figs. 9 and 10 as well as in the constructions shown in the preceding figures.

Where it is found that it is not possible to obtain the desired length of leaf spring assembly in the constructions illustrated in Figs. 9, 10 and 11 because of the small diameter of the co-operating brake drum, it will, of course, be possible to position the leaf springs and their housings and cams inwardly of the corresponding brake drum according to the practice disclosed in Figs. 5 to 7, inclusive, and if desired the leaf spring assemblies and their housings may be secured directly to the frame of the vehicle after the teachings of Fig. 4. Such a modification is illustrated in Fig. 12 which shows the application thereof to the steering wheel of a motor vehicle. In this figure the frame of the vehicle is illustrated at 20" and the housing for the cams and the leaf springs at 152". The housing 152" in this instance is fixed directly to the frame side member 20" and extends a material distance both above and below the frame, thus enabling the employment of relatively long leaf assemblies 166" therein. The housing 152" is preferably formed to provide a curved track 168" for co-operation with each of the leaf spring assemblies 166" for the same general purpose as described in connection with the previously described construction. In this modification one shaft 162" only is provided within the housing 152", this at the lower portion thereof, and is provided with a pair of cams 164" one of which cooperates with each of the leaf spring assemblies 166". A pair of links 177" fixed to opposite ends of the shaft 162" pivotally connect the shaft 162" with a collar 180 mounted on the king-pin 182 for the steering knuckle 184 of the wheel 186. The shaft 160" is positioned exteriorly of the housing 152' and is pivotally connected by a pair of links 176" secured to opposite ends thereof with a collar 188 mounted on the king-pin 182 at the upper end of the steering knuckle 184. It will be noted that in this construction the length of the leaf spring assemblies 166" is considerably greater than the corresponding distance between the axes of the shafts 160" and 162", this permitting a moderate spacing of the links 176" in a vertical direction without restricting the length of the leaf spring assemblies which may be employed. In the construction shown in Fig. 12 it will be obvious that any suitable means may be provided for controlling the steerable position of the wheel 186 and steering knuckle 184 with respect to the axis of the king-pin 182 in order to control the steering movement of the wheel.

Formal changes may be made in the specific embodiments of the invention described without departing from the spirit or substance of the broad invention, the scope of which is commensurate with the appended claims.

What I claim is:

1. In combination with a vehicle having a chassis part and a plurality of wheel parts, means individual to each of said wheel parts interconnecting it to said chassis part for movement relative thereto and serving as the main load transmitting means between it and said chassis, including camming means rotatably supported by one of said parts, leaf spring means carried by said one of said parts in cooperative relationship with respect to said camming means whereby rotatable movement of said camming means stresses said leaf spring means in varying amounts, link means pivotally connecting said parts and constraining the relative movement between said parts to a predetermined path, and means cooperating between said link means and said camming means controlling the rotatable position of said camming means in accordance with the relatively movable position between said parts, said leaf spring means and said camming means being so constructed and arranged that the stress of said leaf spring means is increased during movement between said parts in both directions from a position intermediate their opposite limits of relative movement.

2. In combination with a vehicle having a chassis part and a wheel part movable thereto, a plurality of rigid links pivotally connecting said parts together so as to constrain the relative movement of one part with respect to the other part to a predetermined path, camming means rotatably carried by one of said parts and connected to one of said links whereby its rotatable position with respect to said part is varied during relative movement between said parts, and leaf spring means serving as the sole transmitting means between the parts carried by said one of said parts and held in stressed relation by said camming means whereby said stressed relation is varied during rotatable movement of said camming means upon relative movement between said parts during variations of said load, the construction and arrangement being such that the stress set up in said leaf spring resists relative movement between said parts in at least one direction from a predetermined relative position of said parts.

3. In combination, a pair of relatively movable parts, a plurality of rigid links pivotally connecting said parts and constraining the relative movement of one with respect to the other along a predetermined path, leaf spring means fixed at one end with respect to one of said parts, cam means rotatably carried by said one of said parts and maintaining said leaf spring means under a stress varying with the rotatable position of said cam means, and said cam means being connected to one of said links whereby relative movement between said parts effects rotatable movement of said cam means.

4. In combination with a pair of relatively movable parts, a plurality of rigid links pivotally connecting said parts and constraining the relative movement of one of said parts with respect to the other thereof along a predetermined path, leaf spring means fixed at one end thereof with respect to said one of said parts, cam means rotatably carried by said one of said parts bearing against the free end portion of said leaf spring means and constantly maintaining said leaf spring means under a stress, said cam means being connected to one of said links whereby relative movement between said parts varies the rotatable position of said cam means, said cam means and said leaf spring means being so constructed and arranged that the reaction between them constantly tends to maintain said parts in a predetermined position of movement intermediate the limits of movement therebetween in opposite directions.

5. In combination with a pair of relatively movable parts, a pair of spaced links pivotally connecting said parts together and constraining said parts to a predetermined path of movement with respect to each other, a pair of cams rotatably carried by one of said parts with the axes of said cams in spaced relation, a pair of leaf spring means carried by said one of said parts, one end of each of said leaf spring means being fixed with respect to said one of said parts and the free end of each of said spring means being engaged by a corresponding of said cams, said cams and said spring means being so constructed and arranged that variation in the rotatable position of said cams with respect to said one of said parts will vary the stress in said spring means, and said cams being connected to said links whereby relative movement between said parts will effect rotatable movement of said cams with respect to said one of said parts.

6. In combination with a pair of relatively movable parts, a plurality of rigid link means pivotally connecting said parts and constraining said parts to a predetermined path of movement with respect to each other, leaf spring means carried by one of said parts and having one end thereof anchored with respect thereto, cam means rotatably carried by said one of said parts in engagement with the free end of said leaf spring means and constantly maintaining said leaf spring under stress, said cam means being connected to one of said links whereby the rotatable position of said cam means with respect to the said one of said parts is controlled by the relatively movable position of said parts, said cam and said spring means being so constructed and arranged as to constantly urge said parts toward a predetermined relative movable position with respect to each other intermediate the limits of relative movement between said parts.

7. In combination with a pair of relatively movable parts, camming means rotatably supported by one of said parts, leaf spring means carried by said one of said parts in cooperative relationship with respect to said camming means whereby rotatable movement of said camming means stresses said leaf spring means in varying amounts, link means pivotally connecting said parts and constraining the relative movement between said parts to a predetermined path, means cooperating between said link means and said camming means controlling the rotatable position of said camming means in accordance with the relatively movable position between said parts, said leaf spring means and said camming means being so constructed and arranged that the stress of said leaf spring means is increased during movement between said parts in both directions from a position intermediate their opposite limits of relative movement, and camming means fixed with respect to said one of said parts for varying the rate of deflection of said leaf spring means during stressing thereof by said rotatable camming means.

8. In combination with a pair of relatively movable parts, a plurality of links pivotally connecting said parts together so as to constrain the relative movement of one part with respect to the other part to a predetermined path, camming means rotatably carried by one of said parts and connected to one of said links whereby its rotatable position with respect to said part is varied during relative movement between said parts, leaf spring means carried by said one of said parts and held in stressed relation by said camming means whereby said stressed relation is varied during rotatable movement of said camming means upon relative movement between said parts, the construction and arrangement being such that the stress set up in said leaf spring resists relative movement between said parts in at least one direction from a predetermined relative position of said parts, and camming means fixed with respect to said one of said parts for varying the rate of deflection of said leaf spring means during stressing thereof by said rotatable camming means.

9. In combination with a pair of relatively movable parts, a pair of spaced links pivotally connecting said parts together and constraining said parts to a predetermined path of movement with respect to each other, a pair of cams rotatably carried by one of said parts with the axes of said cams in spaced relation, a pair of spring means carried by said one of said parts, one end of each of said spring means being fixed with respect to said one of said parts and the free end of each of said spring means being engaged by a corresponding of said cams, said cams and said spring means being so constructed and arranged that variation in the rotatable position of said cams with respect to said one of said parts will vary the stress in said spring means, said cams being connected to said links whereby relative movement between said parts will effect rotatable movement of said cams with respect to said one of said parts, and cams fixed with respect to said one of said parts for varying the rate of deflection of said spring means during stressing thereof by said rotatable cams.

10. In an automobile spring suspension, in combination with a vehicle frame member, and a wheel supporting member, a pair of spaced rigid links pivotally connected with respect to both of said members, cam means rotatably supported by one of said members and connected to one of said links whereby its rotatable position with respect to said one of said members is varied in accordance with the movable relation of the other of said members thereto, leaf spring means carried by said one of said members and so constructed and arranged between said one of said members and said cam means as to constitute substantially the sole load transmitting means between said wheel support member and said frame member and to be constantly maintained under stress variable in accordance with the rotatable position of said cam means.

11. In an automobile spring suspension, in combination, with a vehicle frame member and a wheel supporting member, a plurality of rigid link means pivotally connected with respect to said frame member and supporting member respectively constraining movement of one with respect to the other thereof along a predetermined path, cam means rotatably supported by one of said members, said cam means being connected to said link means whereby relative movement between said members varies the rotatable position of said cam means with respect to one of said members, and leaf spring means carried by one of said members cooperating with said cam means whereby to constantly urge said members toward a predetermined position of relative movement intermediate the limits of relative movement between them in opposite directions of movement, said leaf spring means serving to support that portion of the load on said frame member transmitted to the ground through said wheel supporting member.

12. In a wheel suspension for motor vehicles, in combination, with the frame and a wheel supporting member therefor, a pair of spaced rigid links connected to said frame and said wheel supporting member, cam means carried by said wheel supporting member and connected to one of said links whereby relative movement between said member and frame will effect rotational movement of said cam means, and a leaf spring means carried by said member and constantly stressed by said cam means whereby to constantly urge said cam means toward a predetermined position of rotatable movement with respect to said member.

13. In an automobile spring suspension, in combination with a frame and wheel supporting member therefor, a pair of spaced rigid links pivotally connecting said frame and member together for relative movement in a predetermined path, cam means rotatably supported by said frame and connected to one of said links whereby relative movement between said frame and member will effect rotational movement of said cam means with respect to said frame, and leaf spring means carried by said frame, said spring being maintained under stressed relation by said cam means varying in accordance with the rotational position of said cam with respect to said frame and serving as the sole load transmitting means between said wheel supporting member and said frame.

14. In an automobile spring suspension, in combination, a frame, a wheel supporting member, a brake drum rotatably supported on said wheel supporting member, a pair of spaced links pivotally interconnecting said frame and member, cam means rotatably supported by said member, spring means positoned within said brake drum and fixed at one end with respect to said member, said spring means and cam means being so constructed and arranged that said spring means is maintained under stress by said cam means and said stress is varied in accordance with the relative position of said member with respect to said frame.

15. In a spring suspension for motor vehicles, in combination, a chassis frame, a wheel supporting member, a brake drum rotatably supported by said wheel supporting member, a pair of spaced links pivotally interconnecting said frame and member, friction elements within said brake drum, spring means within said brake drum, and cam means rotatably carried by said member in cooperative relation with respect to said spring means and constantly maintaining said spring means under stress, said cam means being connected to one of said links whereby relative movement between said frame and member effects rotational movement of said cam means and variation in the stress of said spring means.

16. In an automobile spring suspension, in combination, with a vehicle frame member and a wheel supporting member, link means pivotally connected with respect to said frame member and supporting member respectively constraining movement of one with respect to the other thereof along a predetermined path, cam means rotatably supported by one of said members, said cam means being connected to said link means whereby relative movement between said members varies the rotatable position of said cam means with respect to one of said members, leaf spring means carried by one of said members cooperating with said cam means whereby to constantly urge said members toward a predetermined position of relative movement intermediate the limits of relative movement between them in opposite directions of movement, and other cam means cooperating with said spring means for varying the rate of deflection thereof during stressing thereof by said rotatable cam means.

17. In a wheel suspension for motor vehicles, in combination, a chassis frame, a wheel supporting member, a brake drum rotatably supported by said wheel supporting member, friction elements within said brake drum, a housing carried by said wheel supporting member and serving as a backing plate for said brake drum, spring means within said housing, cam means rotatably mounted within said housing in co-operative relation with respect to said spring means, and link means connecting said wheel supporting member and said chassis frame connected with said cam means whereby to vary the rotatable position thereof during relative movement between said wheel supporting member and said chassis frame, said spring means and said cam means being so constructed and arranged as to constantly urge said chassis frame and wheel supporting member towards a predetermined position of relative movement between them.

18. In a spring suspension for motor vehicles, in combination, a chassis frame, a wheel supporting member, a bracket member pivotally mounted on said frame for swinging movement about an approximately vertical line, a cam rotatably supported by said bracket member for movement about an approximately horizontal axis, spring means carried by said bracket in cooperating relationship with respect to said cam means, link means connecting said cam means and said wheel supporting member, said cam means and said spring means being so constructed and arranged as to constantly urge said chassis frame and wheel supporting member towards a predetermined position of relative movement between them intermediate their limit of relative movement in opposite directions.

19. In a spring suspension for a motor vehicle having a chassis frame and a wheel supporting member comprising, in combination, means serving as the sole load transmitting means between said member and said frame interconnecting the chassis frame and the wheel supporting member for relative movement including a cam, and spring means cooperating with said cam, the construction and arrangement of said cam and spring means being such that said spring means is constantly maintained under a stress in one direction only and said stress is increased during relative movement between said member and frame in either direction from a relative position intermediate the limits of such movement in opposite directions.

BORGE MARTINS.